United States Patent Office 3,509,152
Patented Apr. 28, 1970

3,509,152
BIS - POLYQUATERNARY AMMONIUM DODECA-
HYDRODODECABORATES AND OCTAHYDRO-
TRIBORATES
Robert Ehrlich, Morristown, and Philip Shapiro, Suc-
casunna, N.J., assignors to Thiokol Chemical Corpora-
tion, Bristol, Pa., a corporation of Delaware
No Drawing. Filed Apr. 28, 1966, Ser. No. 545,881
Int. Cl. C07d 51/64
U.S. Cl. 260—268                                    7 Claims

ABSTRACT OF THE DISCLOSURE

The invention relates to novel boron-containing poly-
quaternary ammonium compounds, particularly to bis-
polyquarternary ammonium dodecahydrododecaborates
and octohydrotriborates. The compounds are useful in
rocket propellants and as reducing agents.

This invention concerns the preparation of a novel class
of polyquaternary ammonium compounds containing sub-
stituents which include boron. More particularly, the in-
vention pertains to polyquaternary ammonium borohy-
drides, dodecahydrododecaborates and octahydrotri-
borates useful as reducing agents, polymerization catalysts
and flame temperature moderators in rocket propellants.

The novel compounds of this invention are included
within the group consisting of:

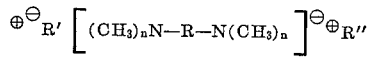

and

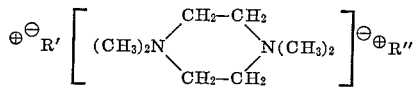

wherein R is selected from the group consisting of methyl-
ene, ethylene, and

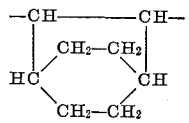

R' and R" taken together are the $B_{12}H_{12}^{-2}$ radical and
taken singly are selected from the group consisting of
$BH_4^{-1}$ and $B_3H_8^{-1}$ radicals; and $n$ is one of the integers 1
through 3.

In a copending application, Ser. No. 545,843, filed in
the United States Patent Office April 28, 1966, the prep-
aration of polyquaternary ammonium thiophenoxides is
described, which novel compounds are intermediates, in
the preparation of a number of the subject compounds.
Other intermediates, polyquaternary ammonium halides,
are described in a copending application, Ser. No. 399,330,
filed in the United States Patent Office on Sept. 25, 1964,
now abandoned. The other reactants are commercially
available or can be synthesized by known methods.

All of the subject compounds, except the alkylene-bis-
compounds, have excellent hydrolytic and thermal stabil-
ity and can be handled in air.

It is accordingly an object of this invention to provide
novel compounds heretofore unreported in the literature.

A further object of this invention is to provide com-
pounds useful as reducing agents, polymerization catalysts
and the flame temperature moderators in rocket propel-
lants.

Where the polyquaternary ammonium borohydrides of
this invention are soluble in water, they are prepared by
(1) contacting a bis(trimethylammonium thiophenoxide)
with lithium borohydride in anhydrous tetrahydrofuran,
(2) filtering to remove the solid product, and (3) drying
the product. Where the polyquaternary ammonium boro-
hydrides are soluble in dimethylformamide, they are pre-
pared by (1) contacting a bis(trimethylammonium chlo-
ride) with sodium borohydride in dimethylformamide,
(2) filtering to remove precipitated sodium chloride, (3)
extracting with tetrahydrofuran, (4) removing the prod-
uct by filtration, and (5) drying the product.

Polyquaternary ammonium dodecahydrododecaborates
are prepared by (1) contacting a polyquaternary am-
monium iodide with di-sodium dodecahydrododecaborate
in aqueous solution, (2) filtering, and (3) washing the
solid product with hot water. The di-sodium dodecahydro-
dodecaborate is prepared by the method of R. M. Adams,
A. R. Siedle and J. Grant, Inorganic Chemistry 3, 461
(1964).

The general method of preparing the polyquaternary
ammonium octahydrotriborates is by (1) contacting a bis-
iodide with potassium octahydrotriborate, and (2) recrys-
tallizing the product from water.

By way of explanation, some specific examples illus-
trating the invention will be described. This is done solely
by way of example, and is intended neither to delineate the
scope of the invention nor limit the ambit of the appended
claims.

EXAMPLE 1

Preparation of ethylene-bis(trimethylammonium
borohydride)

(A) A suspension of 0.020 gram-mole of ethylene-bis-
(trimethylammonium thiophenoxide) in 100 milliliters of
anhydrous tetrahydrofuran was added to 50 milliliters of
a 4 molar solution of $LiBH_4$ in anhydrous tetrahydro-
furan. The mixture was stirred at reflux for 15 hours, then
the white, solid product was filtered, washed thoroughly
with anhydrous tetrahydrofuran and dried. The yield was
2.91 grams of product having a melting point of 239–240°
C., with decomposition. The solid was recrystallized by
dissolving 5 grams in 75 milliliters of hot tetrahydrofuran,
filtering the solution while hot, adding an equal volume of
anhydrous tetrahydrofuran and cooling the solution. The
long, white needles of the product melted at 192° C., with
decomposition. The density was 0.837 g./cc. The theoret-
ical and experimentally determined percentages by weight
of elements in the product were as follows.

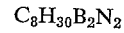

Theoretical—C, 54.61; H, 17.18; B, 12.29; N, 15.92 active
H, 4.58
Experimental—C, 53.23; H, 17.97; B, 12.05; N, 15.03;
active H, 4.49

(B) To a solution of 33 grams (0.15 gram-mole) of
ethylene-bis(trimethylammonium chloride) in 1 liter of dimethylformamide was added a solution of 12 grams of NaBH₄ in 10 milliliters of dimethylformamide. The solution was heated to 60° C. for 15 hours, followed by filtration of the precipitated NaCl. Approximately 150 milliliters of tetrahydrofuran were added to the filtrate, precipitating more NaCl. The solution was filtered and the filtrate tested for halogen. Fractional precipitation was repeated until the filtrate was halogen-free, after which 500 milliliters of anhydrous tetrahydrofuran were added. The mixture was allowed to stand for one hour, then the borohydride salt was isolated. The yield was 9.5 grams of product having a melting point of 189–190° C., with decomposition. The infrared spectrum was identical to that of the material prepared from the thiophenoxide.

EXAMPLE 2

Preparation of tetramethylpiperazinium bis-borohydride

Using the procedure described in Example 1(A), tetramethylpiperazinium bis-borohydride was prepared starting with 0.020 mole of tetramethylpiperazinium bis-thiophenoxide. The yield was 3.0 gram of product having a density of 0.914 g./cc. and a melting point of 185–190° C., with decomposition. The analysis was:

$$C_8H_{28}B_2N_2$$

Theoretical—C, 55.23; H, 16.22; B, 12.45; active H, 4.64
Experimental—C, 54.81; H, 16.29; B, 12.40; active H, 4.56.

EXAMPLE 3

Preparation of N,N'-dimethyl-1,4-diaziniabicyclo[2.2.2] octane bis-borohydride

Using the procedure described in Example 1(A), N,N'-dimethyl-1,4-diaziniabicyclo[2.2.2]octane bis-borohydride was prepared starting with N,N'-dimethyl-1,4-diaziniabicyclo[2.2.2]octane bis-thiophenoxide. The product decomposed above 240° C. Quantitative hydrolysis and elemental analysis confirmed the product composition.

EXAMPLE 4

Preparation of N,N,N',N'-tetramethylpiperazinium dodecahydrodecaborate

A solution of 2.90 grams of Na₂B₁₂H₁₂ (0.15 grammole dissolved in 200 milliliters of water was added to a solution of 5.97 grams of N,N,N',N'-tetramethylpiperazinium diiodide in 250 milliliters of hot water. A white precipitate formed immediately. The mixture was stirred at 70° C. for 30 minutes. The hot reaction mixture was filtered, after which the solid was washed with hot water. It is necessary to keep the water hot because the iodide is only slightly soluble in cold water. The white solid product was dried 3 hours at 80° C. in vacuo. The yield was 3.28 grams. The product density was 0.956 g./cc. and it did not decompose below 360° C. There was no weight loss to 268° C., a 9% weight loss to 300° C., a 12% weight loss to 400° C., and a total of 27% loss by weight to 550° C. The analysis was:

$$C_8H_{32}N_2B_{12}$$

Theoretical—N, 9.79; B, 45.35.
Experimental—N, 9.47; B, 45.46; I, zero.

EXAMPLE 5

Preparation of N,N'-dimethyl-1,4-diaziniabicyclo[2.2.2] octane dodecahydrododecaborate Using the procedure described in Example 4, N,N'-dimethyl - 1,4 - diazinibicyclo[2.2.2]octane dodecahydrododecarborate was prepared starting with 0.01 gram-mole of N,N'-dimethyl - 1,4 - diaziniabicyclo[2.2.2]octane diiodide in water. The product was a white, insoluble material weighing 3.10 grams, which did not appear to melt or decompose below 360° C. There was no weight loss to 225° C., a 10% weight loss to 350° C., a 28% weight loss to 550° C., and a 34% weight loss to 600° C.

EXAMPLE 6

Preparation of methylene-bis(trimethylammonium) dodecahydrododecaborate

A solution of 1.88 grams of Na₂B₁₂H₁₂ (0.01 grammole) in 50 milliliters of water was added to a solution of 3.86 grams (0.01 gram-mole) of methylene-bis(trimethylammonium iodide) in 80 milliliters of water. Precipitation was immediate and 0.40 gram of salt was isolated and dried. The product decomposed above 240° C. without melting.

EXAMPLE 7

Preparation of ethylene-bis(trimethylammonium octahydrotriborate)

To a solution of 4.0 gram (0.01 gram-mole) of the bis-iodide in 10 milliliters of water was added a solution of 1.6 grams (0.02 gram-mole) of KB₃H₈ in 10 milliliters of water. A heavy white precipitate formed immediately and was filtered. The solid was recrystallized twice from hot water and dried in vacuo for 3 hours at 75° C., yielding 1.75 gram of product which decomposed starting at 210° C. and complete at 300–310° C. The salt was stable in water at room temperature for 16 hours. The analysis was:

$$C_8H_{38}N_2B_6$$

Theoretical—C, 42.27; H, 16.85; N, 12.32; B, 28.56.
Experimental—C, 42.86, H, 16.67; N, 12.52; B, 28.36; I, zero.

EXAMPLE 8

Preparation of methylene-bis(trimethylammonium octahydrotriborate)

Using the procedure described in Example 7, methylene-bis(trimethylammonium octahydrotriborate) was prepared. The white crystals changed color above 300° C. and did not melt below 360° C. The product was stable in water at room temperature for 16 hours.

EXAMPLE 9

Preparation of N,N,N',N'-tetramethylpiperazinium bis(octahydrotriborate)

A solution a 0.80 gram (0.002 gram-mole) of the bis-iodide in 10 milliliters of water was added to 0.32 gram (0.004 gram-mole) of KB₃H₈ dissolved in 5 milliliters of water. The insoluble, white octahydrotriborate salt was filtered and recrystallized from hot water. The yield was 0.35 gram of product which melted at 215–219° C., with decomposition. Product density was 0.878 g./cc. The salt was stable in water at room temperature for 16 hours. The analysis was:

$$C_8H_{36}N_2B_6$$

Theoretical—C, 42.64; H, 16.10; N, 12.43; B, 28.83; active H, 7.61
Experimental—C, 43.40; H, 16.51; N, 12.20; B, 28.15; active H, 7.55

EXAMPLE 10

Preparation of N,N'-dimethyl-1,4-diaziniabicyclo[2.2.2] octane bis-octahydrotriborate Using the procedure described in Example 7, N,N'-dimethyl - 1,4 - diaziniabicyclo[2.2.2]octane bis-octahydrotriborate was prepared starting with the bis-iodide. It decomposed without melting, beginning at 200° C. and continuing up to 350° C., at which temperature it charred. Elemental analysis confirmed the synthesis. Again the compound was stable in water at room temperature for 16 hours.

What is claimed is:
1. N,N,N',N' - tetramethylpiperazinium dodecahydrododecaborate.
2. N,N'-dimethyl - 1,4 - diaziniabicyclo[2.2.2]octane dodecahydrododecaborate.

3. Methylene - bis(trimethylammonium)dodecahydrododecaborate.

4. Ethylene - bis(trimethylammonium octahydrotriborate).

5. Methylene - bis(trimethylammonium octohydrotriborate).

6. N,N,N',N' - tetramethylpiperazinium bis(octahydrotriborate).

7. N,N'-dimethyl - 1,4 - diaziniabicyclo[2.2.2]octane bis-octahydrotriborate.

References Cited

UNITED STATES PATENTS

| | | | |
|---|---|---|---|
| 2,738,369 | 3/1956 | Banus | 260—567.6 |
| 3,018,619 | 1/1962 | Doss | 260—268 X |
| 3,108,139 | 10/1963 | Larchar | 260—567.6 |
| 3,127,404 | 3/1964 | Mascoli | 260—268 |
| 3,219,699 | 11/1965 | Ehrlich et al. | 260—567.6 |
| 3,227,754 | 1/1966 | Bragdon | 260—567.6 |
| 3,228,814 | 1/1966 | Jenkins et al. | 260—567.6 |
| 3,265,737 | 8/1966 | Miller et al. | 260—268 X |
| 3,360,569 | 12/1967 | Grafstein | 260—606.5 |
| 3,365,275 | 1/1968 | Muetterties | 260—567.6 X |
| 3,383,399 | 5/1968 | Stafiej et al. | 260—268 X |

DONALD G. DAUS, Primary Examiner

U.S. Cl. X.R.

260—567.6; 60—35.4; 252—188, 429